UNITED STATES PATENT OFFICE.

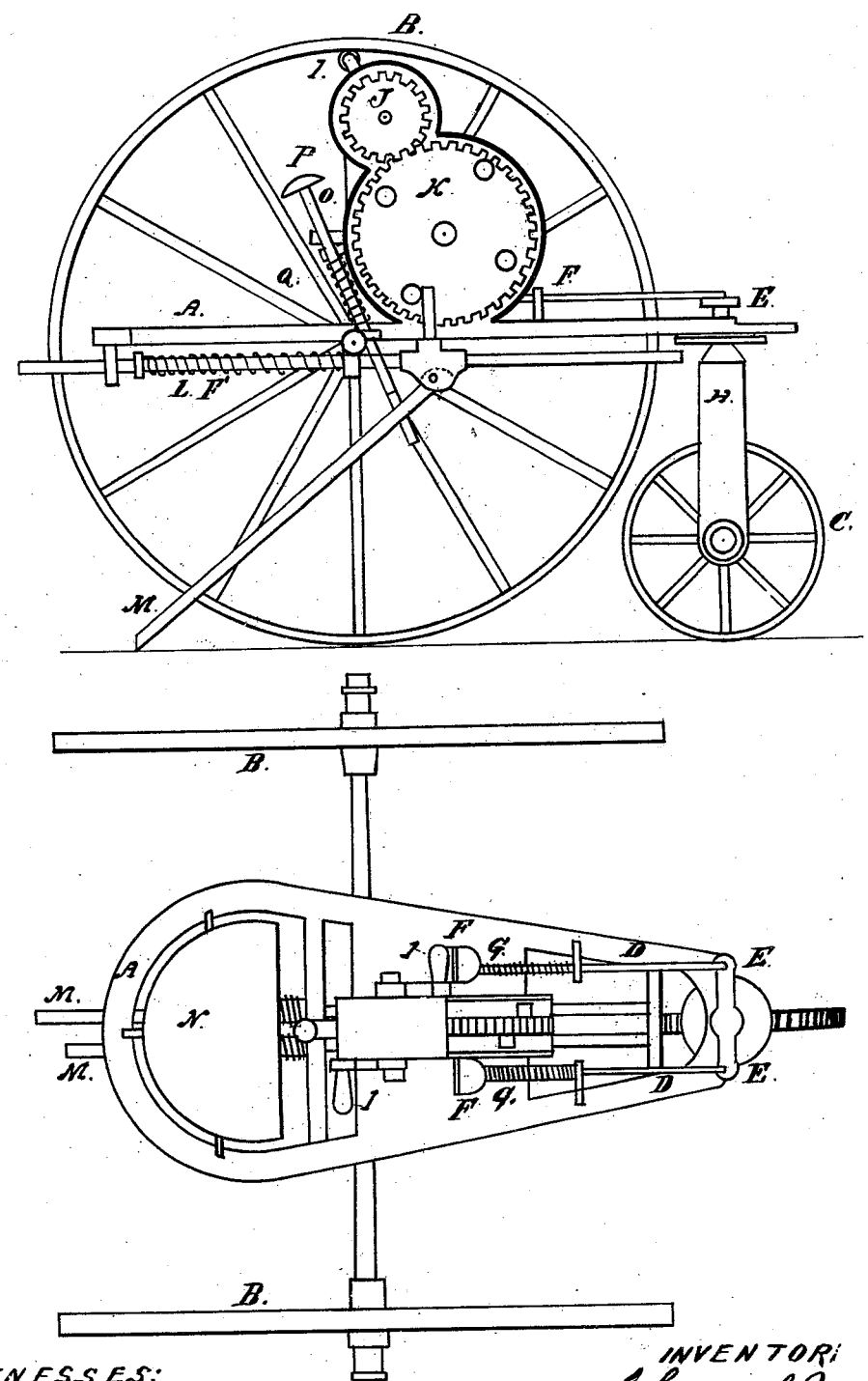

JOHAN A. ZOEBL, OF MILWAUKEE, WISCONSIN.

IMPROVEMENT IN VELOCIPEDE-PROPELLERS.

Specification forming part of Letters Patent No. 208,876, dated October 8, 1878; application filed June 26, 1878.

*To all whom it may concern:*

Be it known that I, JOHAN A. ZOEBL, of the city of Milwaukee, in the county of Milwaukee and State of Wisconsin, have invented certain new and useful Improvements in Velocipede-Propellers; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 of the accompanying drawing represents a sectional side view of my invention. Fig. 2 represents a top view of the same.

The object of my invention is to furnish a device for propelling velocipedes and other vehicles to be operated by the person riding thereon; and consists in an improvement upon a somewhat similar device which I have heretofore invented, and for which I have obtained Letters Patent of the United States bearing date June 18, 1878, and are numbered 204,937, all of which is more fully set forth and described in the specification accompanying said Letters Patent.

My invention consists in an improved device for attaching, arranging, and operating the pivoted pushing-arms; and it also consists in an improved braking device, operated in connection with the pushing-arms; and it finally consists in an improved guiding device, operated by the foot.

In the accompanying drawings, A represents the frame of the velocipede, which is constructed in a substantial manner. B are the hind wheels. C is the guiding-wheel, which is arranged to operate in the yoke H, with which it is turned toward the right or left by the feet of the operator, for the purpose of guiding the vehicle. D are guiding-rods, which are respectively attached to the arms E of the yoke. F are foot-rests. G are spiral springs, which surround the guiding-rods, and, by their equal pressure against each of the arms E, hold the guiding-wheel C in a rigid position, so that without the care of the operator it will remain in line with the hind wheels, and the liability of the velocipede to run off the track is thus avoided.

When desirous to turn the velocipede toward the right or left a slight pressure of the foot is applied to the foot-rest F.

The cranks I and gears J and K and the attachments which engage with the propelling arms are substantially the same as those shown in said Letters Patent.

L are propelling-rods, which, in said patented machine, are arranged to engage with the ground, for the purpose of propelling the vehicle.

The improvement in this propelling device consists in arranging the rods L to operate directly backward and forward on a line parallel to the frame, instead of being inclined downward, as shown in said Letters Patent, and by combining therewith the pushing-arms M, which are each alternately carried forward with the rods, and are thrown backward against the ground by the spiral spring F', thus propelling the velocipede forward in substantially the same manner as by the said previous invention; and the propelling-rods L are also arranged to engage with the gear K, and are operated in substantially the same manner as described in said Letters Patent. N is the seat. O is a device for braking the vehicle. It is arranged to engage with the pushing-arms M when at rest, when, by a downward pressure upon the knob P, the pushing-arms are pressed firmly against the ground, and thus retard the motion of the vehicle. Q is a spiral spring, which supports the rod O above the brakes when released by the operator.

The propelling device may be unbolted from the velocipede and attached to a sled or other vehicle, for the purpose of propelling the same.

Having thus described my invention, what I claim as new, and desire to secure by Letters Patent, is—

1. The combination of the propelling-rods L, as arranged to operate horizontally parallel to the frame A, with the pushing-arms M, substantially as and for the purpose specified.

2. The device for holding and operating the guiding-wheel in a rigid position, operated by the foot, consisting of the yoke H, lever E, and rods D, provided with foot-rests F, in combination with the springs G, all substantially as and for the purpose specified.

3. The braking device consisting of the rod O, provided with knob P and spiral spring Q, as arranged to operate against the pushing-arms, all substantially as and for the purpose specified.

In testimony that I claim the foregoing as my own I affix my signature in presence of two witnesses.

JOH. A. ZOEBL.

Witnesses:
K. SHAWVAN,
JAS. B. ERWIN.